Patented Sept. 28, 1943

2,330,750

UNITED STATES PATENT OFFICE 2,330,750

PROCESS FOR RECOVERING THORIUM FROM SUBSTANCES CONTAINING THORIUM AND IRON

Paul Schaller, Oberhausen - Sterkrade, Ernst Froelecke, Dinslaken, Karl Meyer, Schwarzheide, Ruhland, Oberlausitz, Otto Roelen, Oberhausen-Holten, and Robert Lüben, Oberhausen, Germany, assignors, by mesne assignments, to Hydrocarbon Synthesis Corporation, Linden, N. J.

No Drawing. Application December 31, 1938, Serial No. 248,898. In Germany January 7, 1938

2 Claims. (Cl. 23—22)

It is only with great difficulty that thorium can be recovered from substances containing both thorium and iron. Such mixtures occur when for example, solutions containing thorium in addition to iron are treated with alkalies. Such treatment is found to be necessary when solutions are reacted that are obtained by treating spent catalysts that have been used for the hydrogenation of carbon monoxide and that contain not only cobalt and thorium but also iron which has entered the solution from the kieselguhr employed as carrier. If alkalies be carefully mixed with such solutions, the thorium first precipitates with the iron. It is not possible to recover the thorium from this iron-thorium sludge by direct treatment with a soda lye, as even after a long-continued reaction with a strong soda lye the greater part still remains undissolved.

It has now been found that thorium can be recovered from those substances that contain thorium in addition to iron, particularly from iron-thorium sludge obtained by precipitation, if the sludge is first converted into an acid solution, for which purpose it is possible to use nitric acid, sulphuric acid, and hydrochloric acid as well as all other acids that yield soluble salts. It has been found possible to maintain dissolved the greater part of the thorium in a condition free from iron by charging the solution of iron thorium salts, obtained by dissolving the iron thorium sludge, with an excess of alkali carbonate, until the thorium carbonate first precipitated is again dissolved, the iron being precipitated in the form of the hydroxide. Soda for example is used as alkali carbonate, employed advantageously in the ratio of from 4:1 to 8:1, calculated on the thorium, reckoned as thorium oxide, contained in the solution. For this precipitation it is advantageous to employ slightly elevated temperatures—such, for example, as from 40 to 50° C. for the purpose of effectively excluding the possibility of the double salt of sodium and thorium that has been formed crystallizing out. The recovery of the thorium from the solution of sodium and thorium carbonates that is free from iron can then be effected by boiling the solution after it has been diluted with water and a little caustic soda, the thorium salt being quantitatively hydrolised at boiling heat to produce bicarbonate.

It is possible to recover about 90% of the thorium in a condition free from iron in the manner hereinbefore described. Moreover, the present process also makes it possible to separate the remainder of the thorium from the iron. For this purpose the precipitate, which consists of iron hydroxide—the remainder being thorium, is dissolved in acid, and thereupon the solution obtained has mixed with it the same quantity of soda calculated on the thorium oxide originally present, temperatures that are advantageously very close to the boiling point of the solution (for example, 80 to 90° C.) being employed for the recovery of the thorium from the iron, which is carried out as completely as possible. At the same time practically the entire quantity of the thorium still present remains in solution. The precipitated iron hydroxide contains generally only about 0.5% of the thorium oxide that was originally contained in the iron-thorium sludge and that may be recovered by a further dissolving operation and precipitation.

It has been found to be a particularly advantageous method of carrying out the process according to the invention to make use of the solution of double carbonates of alkali and thorium, which is obtained by the addition of alkali carbonate to the acid solution of the second stage, for precipitating the iron in the first stage. The alkaline washing liquors are also here advantageously employed: they arise in the washing out of the iron hydroxide precipitated in the first stage. Of especial importance is not only the complete recovery of the thorium but also the complete elimination of injurious by-products that are difficult to treat. The iron hydroxide also produced can be employed during the course of the benzine synthesis for thoroughly purifying the synthesis gas.

Example

A solution containing per litre 66 gms. of $ThO_2$ and 27 gm. $Fe_2O_3$ is obtained, by using nitric acid, from iron-thorium sludge that is secured as a preliminary precipitate in the treatment of acid solutions of spent cobalt-thorium-kieselguhr catalysts that have been used for the hydrogenation of carbon monoxide with alkali carbonates, and in which are contained thorium and iron in the approximate proportion of 1:3. For the purpose of precipitating the iron from this solution a soda solution is employed that contains 150 gm. per litre. To every part of $ThO_2$ in the solution to be precipitated, 6 parts of anhydrous soda are used. After precipitating and then stirring for 15 minutes, followed by the washing of the precipitate with 20% of the amount of soda used for the precipitation, the combined liquids contain 91% of all the thorium oxide, 9% of $ThO_2$ remaining in the precipitate. The precipitate is dissolved in nitric acid, whereupon soda is added to the solution, the quantity being the same as in the first stage. The precipitation, effected at 75° C., is likewise followed by a stirring for 15 minutes, whereupon the filtered precipitate is washed with a soda solution of 100 gm. per litre until there is no more thorium in the filtrate. In this way it is possible to recover the thorium from the iron so thoroughly that the precipitate of the second stage contains only 0.4% of the thorium used in the process. Thus altogether 99.6% of all the thorium oxide is dissolved. The solution of double carbonates of sodium and thorium obtained in the second stage is used for precipitating the iron in the first stage. The solution thus obtained after the precipitate has been removed and after the soda used for washing the precipitate has been combined, is charged with a sufficient quantity of water and a little caustic soda. From this the thorium is precipitated by boiling in the form of thorium bicarbonate, which is treated in known manner. After drying and suitable treatment the iron hydroxide which in the latter stages contains practically no thorium, may be used, for example, in the desulphurization of water gas and similar synthesis gases containing carbon monoxide.

We claim:

1. A process for recovering thorium from precipitates which contain thorium and a substantial amount of iron and which have been obtained by treating salt solutions containing said metals with alkaline precipitating agents, comprising a first stage including the steps of dissolving such precipitates in an acid, adding to the solution thus obtained more alkali carbonate than required to convert all the thorium in the solution into thorium carbonate, thereby precipitating all of the iron while leaving most of the thorium in solution as thorium-alkali double carbonate and separating the precipitate from the solution, and at least one subsequent stage including the steps of dissolving the latter precipitate containing the iron and some of the thorium in an acid and adding to the solution thus obtained approximately the same quantity of alkali carbonate as used in the first stage, whereby all iron present is again precipitated while substantially all the thorium that was associated with the iron remains in the solution, a moderately elevated temperature being employed in the precipitation of the iron in the first stage and a materially higher temperature in the precipitation of the iron in any subsequent stage.

2. A process according to claim 1 including a plurality of stages wherein the temperature of about 40-50° C. is employed in the precipitation of the iron in the first stage and the temperature of 75-90° C. in the precipitation of the iron in any subsequent stage.

PAUL SCHALLER.
ERNST FROELECKE.
KARL MEYER.
OTTO ROELEN.
ROBERT LÜBEN.